United States Patent
Erpelding et al.

(10) Patent No.: US 7,553,155 B2
(45) Date of Patent: Jun. 30, 2009

(54) APPARATUS AND METHOD FOR THE PRODUCTION OF CEMENT CLINKER

(75) Inventors: Richard Erpelding, Soest (DE); Guenter Driemeier, Lienen (DE)

(73) Assignee: Polysius AG, Beckum (DE)

( * ) Notice: Subject to any disclaimer, the term of this patent is extended or adjusted under 35 U.S.C. 154(b) by 0 days.

(21) Appl. No.: 11/578,524

(22) PCT Filed: Feb. 21, 2005

(86) PCT No.: PCT/EP2005/001787

§ 371 (c)(1),
(2), (4) Date: Aug. 20, 2007

(87) PCT Pub. No.: WO2005/108891

PCT Pub. Date: Nov. 17, 2005

(65) Prior Publication Data
US 2008/0038682 A1    Feb. 14, 2008

(30) Foreign Application Priority Data
Apr. 16, 2004 (DE) .................. 10 2004 018 571

(51) Int. Cl.
   C04B 2/10   (2006.01)
   F27B 15/00  (2006.01)
(52) U.S. Cl. .................. 432/58; 432/14; 106/739
(58) Field of Classification Search .................. 432/14, 432/58; 106/705, 713, 739, 745; 110/246
See application file for complete search history.

(56) References Cited

U.S. PATENT DOCUMENTS

| | | | | |
|---|---|---|---|---|
| 4,014,641 A * | 3/1977 | Shigeyoshi et al. | ........... | 432/58 |
| 4,476,816 A * | 10/1984 | Cannon et al. | ............... | 122/4 D |
| 5,919,301 A * | 7/1999 | Rother et al. | ................ | 106/761 |
| 5,935,525 A * | 8/1999 | Lincoln et al. | ............... | 422/121 |
| 5,975,891 A | 11/1999 | Hundebøl | | |
| 6,210,154 B1 * | 4/2001 | Evans et al. | .................. | 432/106 |
| 6,258,335 B1 * | 7/2001 | Bhattacharya | ........... | 423/213.2 |
| 6,733,283 B2 * | 5/2004 | Skaarup Jensen et al. | ..... | 432/14 |
| 7,198,698 B1 * | 4/2007 | Richards et al. | .......... | 204/157.3 |
| 2003/0157007 A1* | 8/2003 | Samant et al. | ........... | 423/239.1 |
| 2004/0025753 A1* | 2/2004 | Brunner et al. | ............. | 106/739 |
| 2004/0042946 A1 | 3/2004 | Vicard | | |
| 2008/0038682 A1* | 2/2008 | Erpelding et al. | ............. | 432/13 |

\* cited by examiner

*Primary Examiner*—Gregory A Wilson
(74) *Attorney, Agent, or Firm*—Stites & Harbison PLLC; Ross F. Hunt, Jr.; Douglas E. Jackson

(57) ABSTRACT

Apparatus and method for the production of cement clinker, wherein raw meal is preheated in a heat exchanger and is burnt in a kiln to form cement clinker and the exhaust gases from the kiln flow in succession through the heat exchanger and a catalytic converter, wherein the exhaust gases are analysed before and/or after the catalytic converter arid the preheated raw meal is precalcined in a calciner. Moreover, for the subsequent catalytic exhaust gas purification the provision of a calciner has the advantage that higher exhaust gas temperatures are produced so that a throughput is produced. As a result the required volume of the catalytic converter is reduced and the investment costs are lowered.

14 Claims, 3 Drawing Sheets

APPARATUS AND METHOD FOR THE PRODUCTION OF CEMENT CLINKER

CROSS-REFERENCE TO RELATED APPLICATIONS

Figure 1:
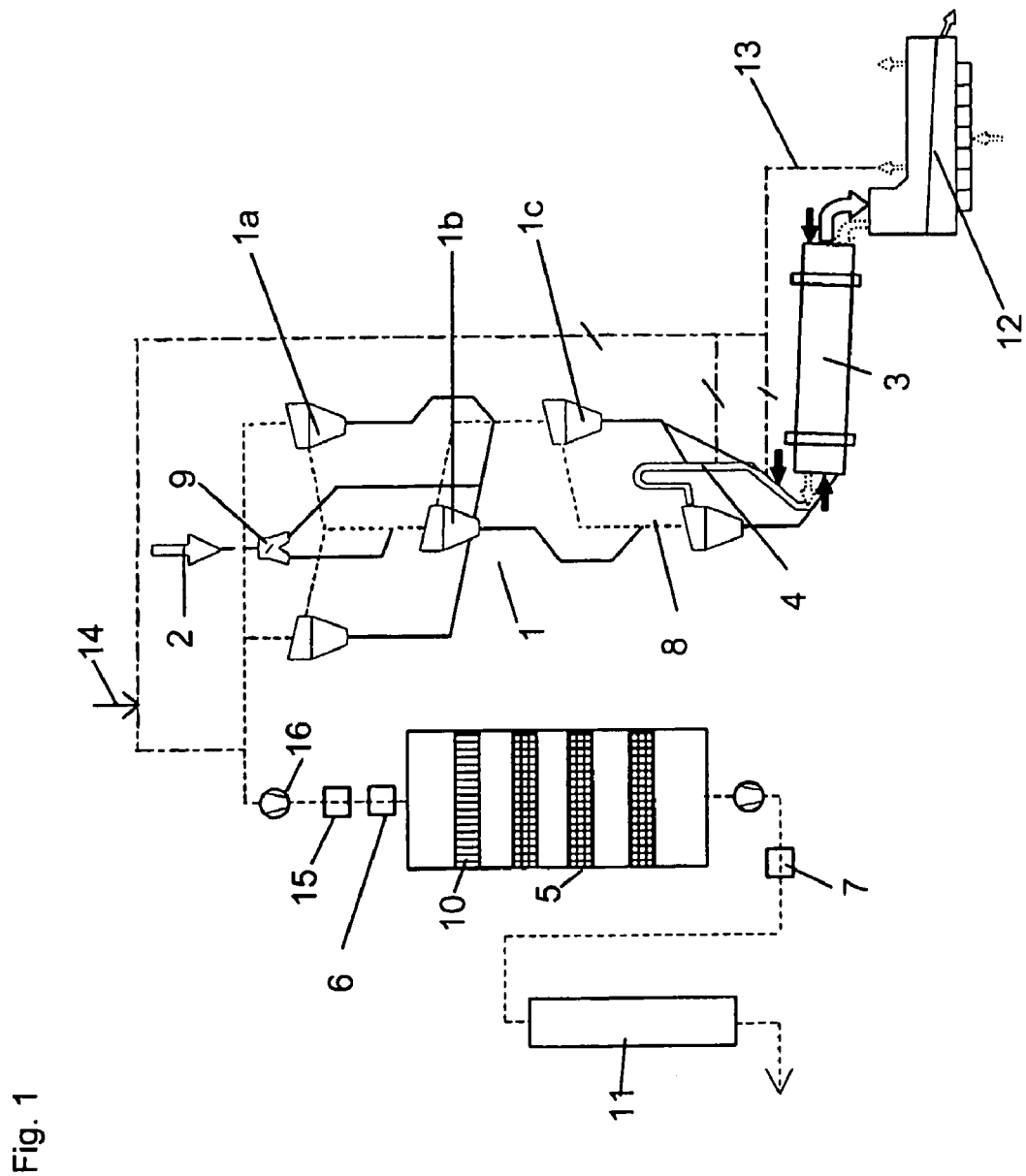

This application is the U.S. national phase of international application PCT/EP2005/001787 filed Feb. 21, 2005 which designated the U.S. and claims benefit of DE 10 2004 018 571.9, filed Apr. 16, 2004, the entire content of which is hereby incorporated by reference.

FIELD OF THE INVENTION

The invention relates to an apparatus and to a method for the production of cement clinker, wherein raw meal is preheated in a heat exchanger and is burnt in a kiln to form cement clinker.

BACKGROUND OF THE INVENTION

Due to the high temperatures of the flame prevailing in the kiln sulphur oxides and nitrogen oxides form in the kiln and have to be removed from the exhaust gases.

DE-A-100 11 327 describes a method for the simultaneous desulphurisation and denitrogenation without the formation of ammonium sulphate or ammonium hydrogen sulphate in which the breakdown of $NO_x$ to $N_2$ and $H_2O$ takes place. The treatment of the exhaust gases containing sulphur oxides and nitrogen oxides is carried out in an apparatus which is equipped with a fixed catalytic converter and is disposed in the direction of flow of the exhaust gases to the heat exchanger.

BRIEF SUMMARY OF THE INVENTION

An object of the invention is to make further improvements to the catalytic exhaust gas purification in an apparatus or a method for the production of cement clinker.

The apparatus according to the invention for the production of cement clinker basically comprises a heat exchanger for the preheating of raw meal, a kiln for the final burning of the cement clinker, wherein the exhaust gases from the kiln flow through the heat exchanger, a catalytic converter which is disposed in the direction of flow of the exhaust gases after the heat exchanger and means for the analysis of the exhaust gases before and/or after the catalytic converter. Furthermore a calciner is provided for the precalcination of the preheated raw meal.

In the method according to the invention for the production of cement clinker raw meal is preheated in a heat exchanger and is burnt in a kiln to form cement clinker, wherein the exhaust gases from the kiln flow in succession through the heat exchanger and a catalytic converter, the exhaust gases being analysed before and/or after the catalytic converter. Moreover, the preheated raw meal is precalcined in a calciner, i.e. the calcium carbonate which is contained in the raw meal is thermally split into calcium oxide and $CO_2$.

By a suitable choice of the combustion conditions in the calciner a reduction in the pollutants in the exhaust gas can already be achieved there so that the catalytic converter can be designed for lower reduction rates.

According to a preferred embodiment the calciner has means for the staged delivery of fuel and/or means for the staged delivery of air for combustion. Moreover, it is possible that an additional combustion chamber through which the exhaust gases from the kiln do not flow is provided in the calciner. By these measures the combustion conditions in the calciner can be set very specifically and can be tailored to the fuels used.

According to a further variant it is provided that the catalytic converter is designed for a reaction of NO with CO. In this case the calciner is advantageously operated in such a way that increased CO is contained in the exhaust gas. In such a catalytic converter the CO content is advantageously tailored specifically to the catalytic converter by the combustion conditions in the calciner and/or by the addition of further fuel.

Furthermore, it is possible for a reducing agent, in particular an ammonium carrier and/or a hydrocarbon, to be introduced in the region of the calciner and/or of the heat exchanger. The quantity of reducing agent to be introduced is adjusted according to the analysis of the exhaust gases measured before and/or after the catalytic converter.

Further embodiments and advantages of the invention are explained in greater detail below with reference to the description and the drawings.

BRIEF DECRIPTION OF THE DRAWINGS

Figure 2:
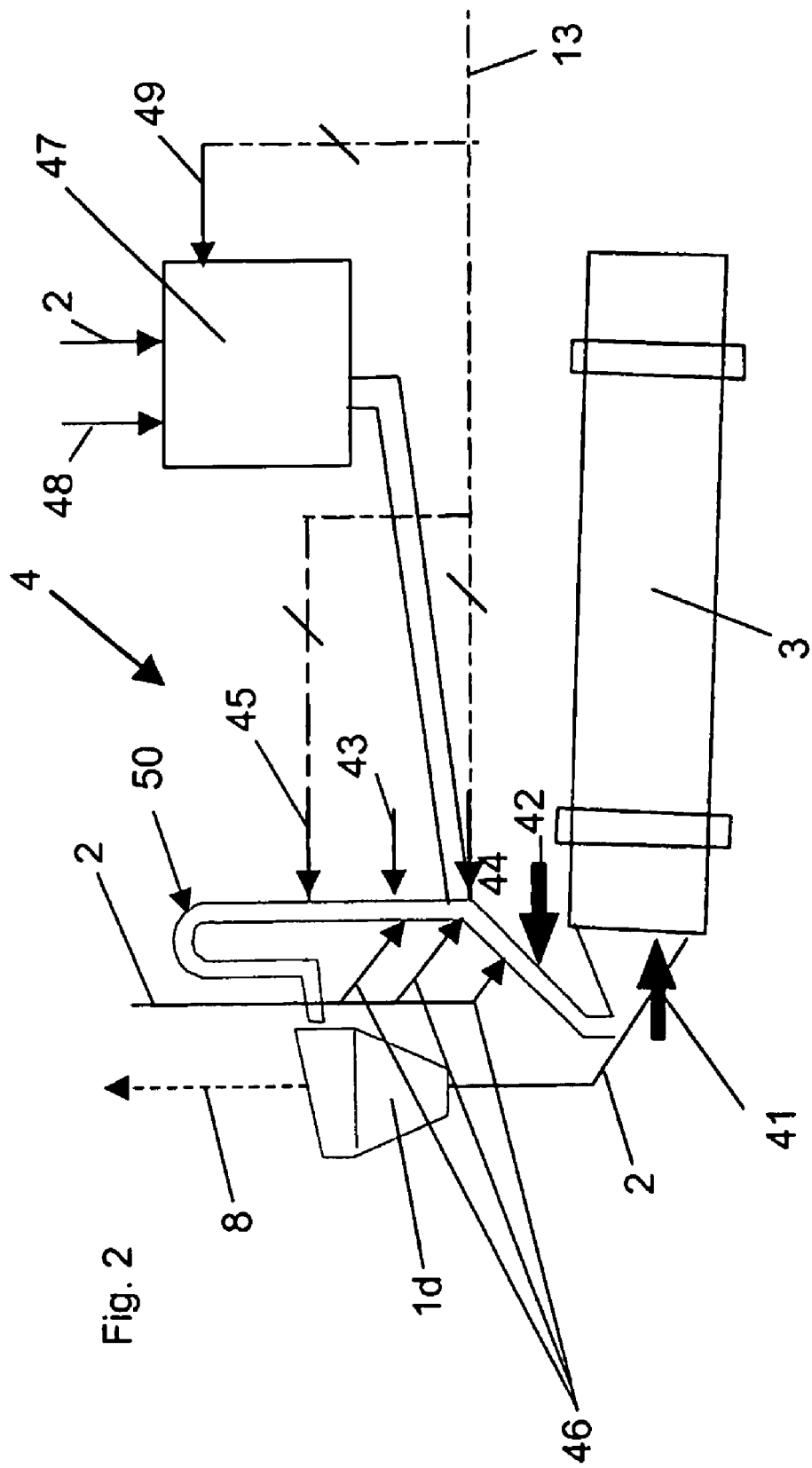
Figure 3:
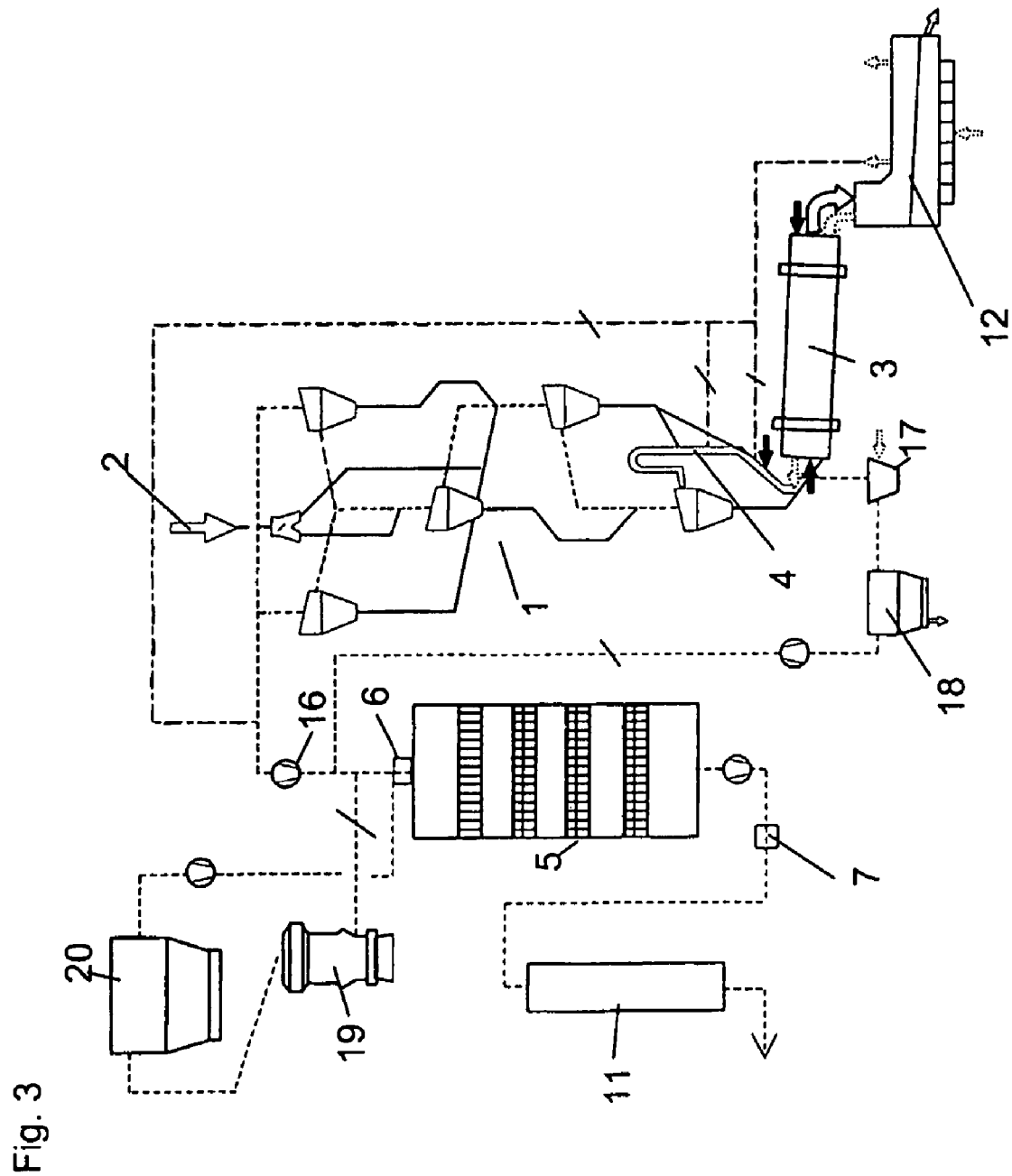

In the drawings:

FIG. 1 shows a schematic representation of an apparatus for the production of cement clinker, FIG. 2 shows a schematic representation in the region of the calciner, and FIG. 3 shows a schematic representation of an apparatus for the production of cement clinker according to a further variant.

DESCRIPTION OF THE PREFERRED EMBODIMENTS

The apparatus basically comprises a heat exchanger 1 for the preheating of raw meal 2, a kiln 3 for the final burning of the cement clinker, wherein the exhaust gases from the kiln flow through the heat exchanger, a calciner 4 for the precalcination of the preheated raw meal and a catalytic converter 5 which is disposed in the direction of flow of the exhaust gases after the heat exchanger. Furthermore, means 6 and 7 are provided for the analysis of the exhaust gases before and/or after the catalytic converter 5.

The heat exchanger 1 has a plurality of cyclone stages 1a, 1b, 1c which are disposed one above the other, wherein the raw meal 2 flows through the individual cyclone stages from top to bottom whilst the exhaust gases 8 (shown by broken lines) pass through the cyclone stages from bottom to top.

The raw meal 2 can optionally be fed via a material deflector 9 in order to deliver a proportion of the raw meal in the region of the uppermost cyclone stage 1a and a proportion in the region of the cyclone stage 1b which lies below it. With this measure the temperature of the exhaust gases entering the catalytic converter 5 after the heat exchanger 1 can be specifically set or varied.

The catalytic converter 5 can be disposed in one or several levels, wherein planar and/or grooved plates can be used. The catalytic converter can be formed selectively by a $V_2O_5/TiO/WO$ catalytic converter or by natural or synthetic crystals in particular with zeolite structure. However, the catalytic converter can also contain one or a combination of the elements of groups Ib, IIb, IIIb, IVb, Vb, VIb, VIIb, VIIIb of the Periodic Table. It is also conceivable that the various levels of the catalytic converter are equipped with different catalyst materials.

In modern cement kilns the material is preheated in cyclone heat exchangers. The consequence of this is that the exhaust gas after the last cyclone has a rotating flow component in addition to the axial component. In order to ensure a uniform flow into the catalytic converter a flow rectifier 10 is disposed upstream of the catalytic converter 5 in the direction of flow of the exhaust gases, and this flow rectifier equalises the gas flow over the cross-section and reduces the radial speed components as far as possible. This leads to optimal utilisation of the available space for the catalytic converter and thus to a reduction in the volume of the catalytic converter to be installed.

Furthermore, the catalytic converter 5 can be equipped with a device (not shown) which makes it possible to remove dust adhering to the catalytic converter.

Moreover, an evaporation cooling tower 11 is provided after the catalytic converter.

The cement clinker burnt in the kiln 3 is then cooled in a clinker cooler 12, wherein the exhaust air 13 from the clinker cooler (shown by dash-dot lines) can be used as air for combustion in the kiln, calciner and optionally for mixing with the exhaust gases after the heat exchanger 1.

FIG. 2 shows a possible embodiment of the calciner 4 in which the preheated raw meal 2 is precalcined with the addition of fuel. In the precipitating cyclone 1d the precalcined raw meal 2 is separated from the exhaust gas 8, and then the exhaust gas flows through the cyclone stages 1c, 1b and 1a, whilst the precalcined raw meal 2 proceeds into the kiln 3 for final burning.

In many cases the calciner has only one combustion point on the calciner 4. However, it is particularly advantageous if in combination with this calciner combustion point a kiln inlet burner 41 and/or further means 42 and/or 43 are provided for the staged addition of fuel. In this way a staged combustion in the calciner is possible. Thus for example a reducing atmosphere which contributes to the $NO_x$ reduction can be created in the lower region of the calciner.

Furthermore, exhaust air 13 from the clinker cooler is delivered as air for combustion. In this case means 44 and/or means 45 can be provided. If the exhaust air from the cooler is delivered via two locations in the calciner which are spaced from one another, this is referred to as a staged delivery of the air for combustion by which the combustion conditions can be set more specifically with respect to optimising the process with corresponding throttle valves.

Also the raw meal 2 can be delivered to the calciner via one or more points 46. In particular the temperature can be adapted in the calciner by meal splitting in order for example to set a favourable temperature window for the $NO_x$ reduction.

An additional combustion chamber 47 through which the exhaust gases from the kiln 3 do not flow constitutes a further option. This additional combustion chamber 47 has means 48 for the delivery of fuel and means 49 for the delivery of exhaust air from the clinker cooler. Furthermore, at least a proportion of the preheated raw meal 2 is introduced into this additional combustion chamber. The exhaust gases from this combustion chamber together with the raw meal are combined at a suitable point with the exhaust gases from the rotary kiln 3. Furthermore means 50 can be provided in order to introduce a reducing agent, in particular an ammonium carrier and/or a hydrocarbon, in the region of the calciner and/or the heat exchanger 1. The quantity of reducing agent to be introduced is advantageously adjusted according to the analysis of the exhaust gases measured before and/or after the catalytic converter.

According to a particular embodiment of the invention the catalytic converter is designed for a reaction of NO with CO.

In this case the CO content in the exhaust gases flowing through the catalytic converter 5 is tailored specifically to the calciner by the combustion conditions in the calciner and/or by addition of further fuel. The exhaust air 13 from the clinker cooler 12 can be added for example via means 14 to the further fuel, whereby the exhaust air from the clinker cooler which is reacted with the fuel enters the exhaust gases from the preheater 1 in a region between the heat exchanger 1 and the catalytic converter 5.

Furthermore, a separating stage 15 for heavy metals can also be disposed before the catalytic converter in the direction of flow.

The provision of a fan 16 between the heat exchanger 1 and the catalytic converter 5 makes it possible to dissociate the kiln system in terms of pressure from the operation of the catalytic converter.

In FIG. 3 an apparatus for the production of cement clinker according to a further variant is described in which the apparatus is equipped with a bypass. By way of the bypass a proportion of the exhaust gases from the kiln 3 is discharged before the calciner 4, cooled and freed of dust and then is fed back to the exhaust gases before the catalytic converter 5. For this purpose means 17 for cooling the bypass stream and means 18 for removing dust from the bypass stream are provided.

As an alternative or in combination therewith, a further variant is disclosed in FIG. 3 in which a proportion of the exhaust gases is discharged in the direction of flow after the heat exchanger 1, is delivered to a coal mill 19 and a dust removal means 20 and then is fed back to the exhaust gases before the catalytic converter 5.

The combination of the catalytic converter with a calciner 4 results in particular in the following advantages:

The calciner displaces a substantial proportion (approximately 50%) of the thermal energy required for the production of the cement clinker into a temperature range in which thermal $NO_x$ is only produced in insignificant quantities (approximately 850° C.). If a fuel which contains no nitrogen, or only insignificant quantities thereof, is used in the calciner then the $NO_x$-based emissions are lower. The consequence of this is that the catalytic exhaust gas purification can be designed for lower reduction rates. The operating costs can be lowered further by the saving on reducing agents.

For the case where the catalytic converter catalyses the reaction of NO with CO to $N_{=2}$ and $CO_2$ the calciner has the advantage that an apparatus equipped with a calciner usually has higher CO emissions than a simple rotary kiln installation. This has the advantage depending upon the level of the CO values it is possible to dispense completely with additional reducing agents.

Even better is the combination of the catalytic exhaust gas purification with a calciner which functions according to the principle of staged combustion and/or staged addition of meal. These calciners are designed so that, depending upon the type of fuel used they reduce a proportion of the $NO_x$ produced in the kiln and minimise the production of $NO_x$ in the fuel. Thus the basic load of $NO_x$ is even less than in the case of a simple calciner installation with the above advantages. Furthermore in a calciner with staged combustion the possibility exists of specifically generating CO which is particularly advantageous in the case of a NO/CO reduction. With the right design it may be possible to dispense completely with an additional fuel injection after the calciner.

Moreover, the provision of a calciner has the advantage for the subsequent catalytic exhaust gas purification that higher exhaust gas temperatures are produced, so that the reactions proceeding in the catalytic converter proceed more quickly and thus with a higher throughput. In this way the required volume of the catalytic converter can be reduced and the investment costs can be lowered.

It is known that depending upon the raw material in the high-temperature process of clinker burning alkali, sulphur and chlorine cycles are formed between the kiln and the heat exchanger. At the high kiln temperatures the said substances are expelled into the gas phase, in the cooler heat exchanger they are deposited on the material and transported back therewith into the kiln. Because of the dust losses of the cyclones a proportion of this dust proceeds with the gas into the catalytic converter, where it can lead to losses of activity. Furthermore, it is known that when a catalytic converter is used the quantities in circulation are reduced. Thus the proportions of the circulating elements in the dust are also reduced, so that the service life of the catalytic converter is increased.

The invention claimed is:

1. Apparatus for the production of cement clinker with
    a heat exchanger for the preheating of raw meal,
    a kiln for the final burning of the cement clinker, wherein exhaust gases from the kiln flow through the heat exchanger,
    a catalytic converter, disposed in the direction of flow of the exhaust gases after the heat exchanger, for reaction of NO with CO, and
    means for the analysis of the exhaust gases before and/or after the catalytic converter,
    the apparatus further comprising a calciner for precalcination of the preheated raw meal, the calciner having an additional combustion chamber through which the exhaust gases from the kiln do not flow.

2. Apparatus as claimed in claim 1, characterized in that the calciner has means for the staged delivery of fuel and/or means for the staged delivery of air for combustion.

3. Apparatus as claimed in claim 1, characterized in that the calciner has means for the staged delivery of preheated raw meal.

4. Apparatus as claimed in claim 1, characterized in that a flow rectifier is disposed upstream of the catalytic converter in the direction of flow of the exhaust gases.

5. Apparatus as claimed in claim 1, characterized in that a separating stage for heavy metals is disposed between the heat exchanger and the catalytic converter.

6. Apparatus as claimed in claim 1, characterized in that the heat exchanger comprises a plurality of cyclone stages which are disposed one above the other, wherein the raw meal flows through the individual cyclone stages from top to bottom whilst the exhaust gases pass through the cyclone stages from bottom to top, and wherein furthermore a material deflector is provided in order to deliver a proportion of the raw meal in the region of the uppermost cyclone stage and a proportion in the region of the cyclone stage which lies below it.

7. Apparatus as claimed in claim 1, characterized in that means are provided in order to introduce exhaust air from a clinker cooler and/or fuel into the exhaust gases between the heat exchanger and the catalytic converter.

8. Apparatus as claimed in claim 1, characterized in that means are provided for introducing a reducing agent, in particular an ammonium carrier and/or hydrocarbon, in the region of the calciner and/or the heat exchanger.

9. Apparatus as claimed in claim 1, characterized in that a fan is disposed between the heat exchanger and the catalytic converter.

10. Method of producing cement clinker, wherein raw meal is preheated in a heat exchanger and is burnt in a kiln to form cement clinker and exhaust gases from the kiln flow in succession through the heat exchanger and a catalytic converter, and the exhaust gases are analyzed before and/or after the catalytic converter, and wherein a catalytic converter reaction of NO with CO is used, and the CO content is tailored specifically to the catalytic converter by the combustion conditions in the calciner and/or by the addition of further fuel wherein the preheated raw meal is precalcined in a calciner, a reducing agent, comprising an ammonium carrier and/or a hydrocarbon, being introduced in the region of the calciner and/or the heat exchanger, and the quantity of reducing agent to be introduced being adjusted according to the analysis of the exhaust gases measured before and/or after the catalytic converter.

11. Method as claimed in claim 10, characterized in that the heat exchanger comprises a plurality of cyclone stages which are disposed one above the other, wherein the raw meal passes through the individual cyclone stages from top to bottom whilst the exhaust gases flow through the cyclone stages from bottom to top, wherein the raw meal is divided up as a function of the temperature of the exhaust gases flowing through the catalytic converter and is supplied in the region of two different cyclone stages.

12. Method as claimed in claim 10, characterised in that the calciner is operated with a staged combustion and/or a staged delivery of air and/or a staged supply of raw meal.

13. Method as claimed in claim 10, characterized in that a proportion of the exhaust gases from the kiln is discharged before the calciner, cooled and freed of dust and then is fed back to the exhaust gases before the catalytic converter.

14. Method as claimed in claim 10, characterized in that a proportion of the exhaust gases is discharged in the direction of flow after the heat exchanger is delivered to a coal mill and a dust removal means and then is fed back to the exhaust gases before the catalytic converter.

* * * * *